United States Patent
Cormican

[19]

[11] Patent Number: 6,086,101
[45] Date of Patent: Jul. 11, 2000

[54] ADJUSTABLE FLEX SKI APPARATUS

[76] Inventor: Dale DeWayne Cormican, Rte. 1, Box 153, Mentor, Minn. 56736

[21] Appl. No.: 09/008,682

[22] Filed: Jan. 16, 1998

[51] Int. Cl.$^7$ .............................. A63C 5/07; A63C 11/00; B62M 27/02
[52] U.S. Cl. ......................... 280/809; 280/809; 180/182
[58] Field of Search ........................ 280/21.1, 22, 22.1, 280/28, 16, 602, 845, 809; 180/182, 190

[56] References Cited

U.S. PATENT DOCUMENTS

| | | | |
|---|---|---|---|
| Re. 28,423 | 5/1975 | Higginbotham | 280/21.1 |
| D. 183,230 | 7/1958 | Johnson | D71/1 |
| D. 366,014 | 1/1996 | Lindquist et al. | D12/7 |
| 3,123,373 | 3/1964 | Antcliff | 280/12 |
| 3,643,978 | 2/1972 | Westberg | 280/28 |
| 3,765,695 | 10/1973 | McGregor | 280/28 |
| 3,777,831 | 12/1973 | Hale | 280/21.1 |
| 3,782,745 | 1/1974 | Stoveken | 280/18 |
| 3,867,991 | 2/1975 | Brandli | 280/21.1 |
| 3,930,547 | 1/1976 | West | 280/21.1 |
| 3,967,692 | 7/1976 | Hoffman | 280/21.1 |
| 3,985,192 | 10/1976 | Samuelson et al. | 180/190 |
| 4,252,354 | 2/1981 | Lob | 280/21.1 |
| 4,424,979 | 1/1984 | Takagi | 280/21.1 |
| 4,595,211 | 6/1986 | Fitzpatrick | 280/28 |
| 5,040,818 | 8/1991 | Metheny | 280/609 |
| 5,135,249 | 8/1992 | Morris | 280/609 |
| 5,145,195 | 9/1992 | Campbell et al. | 280/28 |
| 5,145,201 | 9/1992 | Metheny | 280/609 |
| 5,165,709 | 11/1992 | Jacques | 280/28 |
| 5,222,749 | 6/1993 | Bergstrom | 280/28 |
| 5,284,357 | 2/1994 | Tinkler | 280/602 |
| 5,344,168 | 9/1994 | Olson et al. | 280/28 |
| 5,360,220 | 11/1994 | Simmons | 280/28 |
| 5,599,030 | 2/1997 | Campbell et al. | 280/28 |
| 5,700,020 | 12/1997 | Noble | 208/28 |

*Primary Examiner*—Lanna Mai
*Assistant Examiner*—Jeffrey Restifo
*Attorney, Agent, or Firm*—Curtis Harr

[57] ABSTRACT

An adjustable flex ski for snowmobiles and similar vehicles. This is molded in one piece entirely of ultra high molecular weight plastic or similar materials. The adjustable flex ski is made up of a ski body, which forms the majority of the invention and provides the base to which the other components are attached. The front portion of this ski is given a pre-load function by bending the forward most portion of the ski body in an upward fashion. It is then held in this position by the use of the gas pre-load shock or dampener, which extends pivotally rearward from the tip of the ski to a ski saddle located on the upper center surface of the ski body. This saddle provides various attachment points for the gas pre-load shock and thus, can vary the amount of pre-load on the ski. The adjustability of the ski body can also be enhanced by the use of internally adjustable gas shocks commonly found on the market today. These shocks may be adjustable on the body of the shock or by a remote mechanism. This configuration allows the tip of the adjustable flex ski to flex in an upwardly fashion when confronting obstacles and, thus, keep the base in contact with the ground, which provides the operator with a greater degree of control in rough terrain.

12 Claims, 4 Drawing Sheets

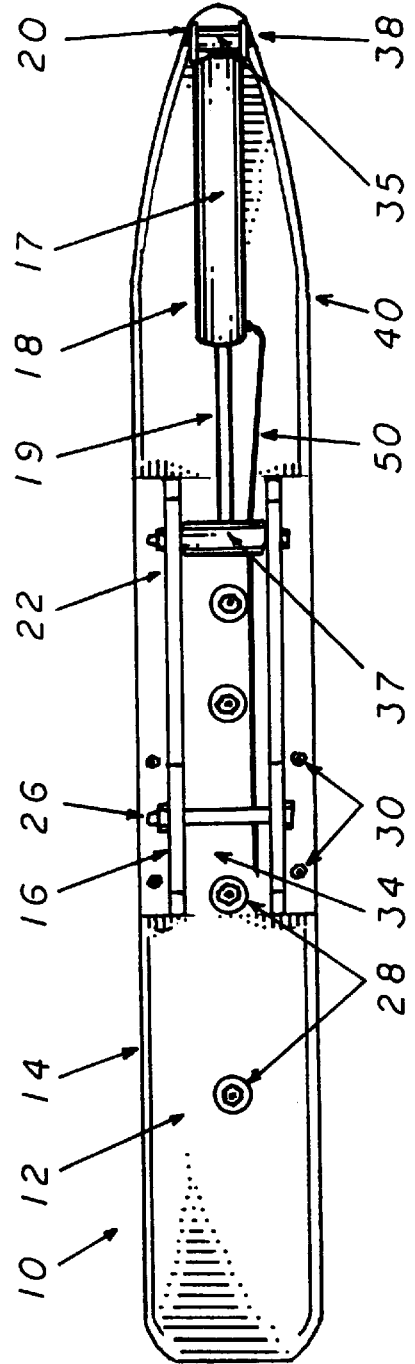
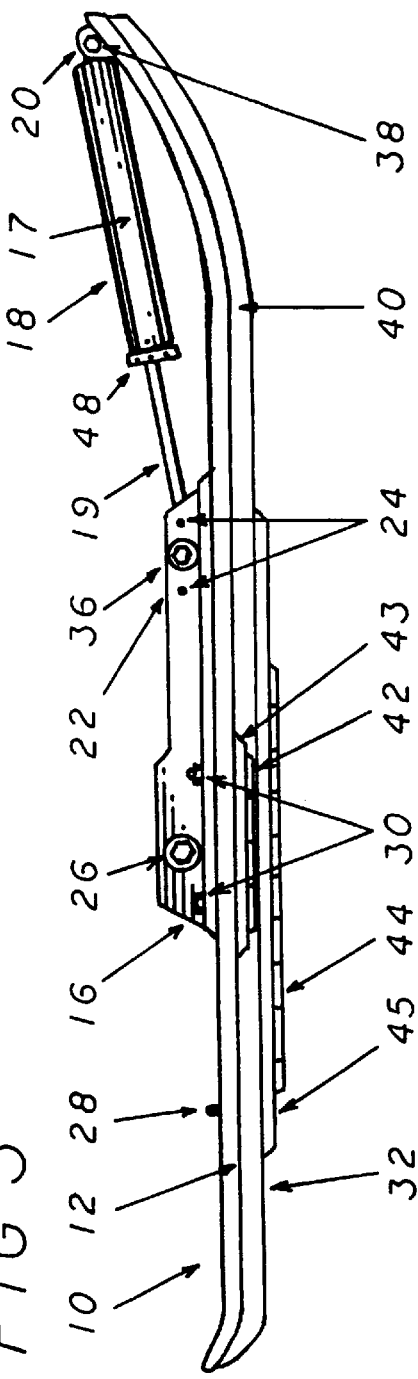

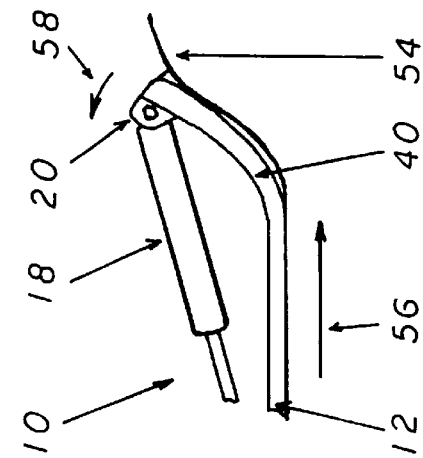
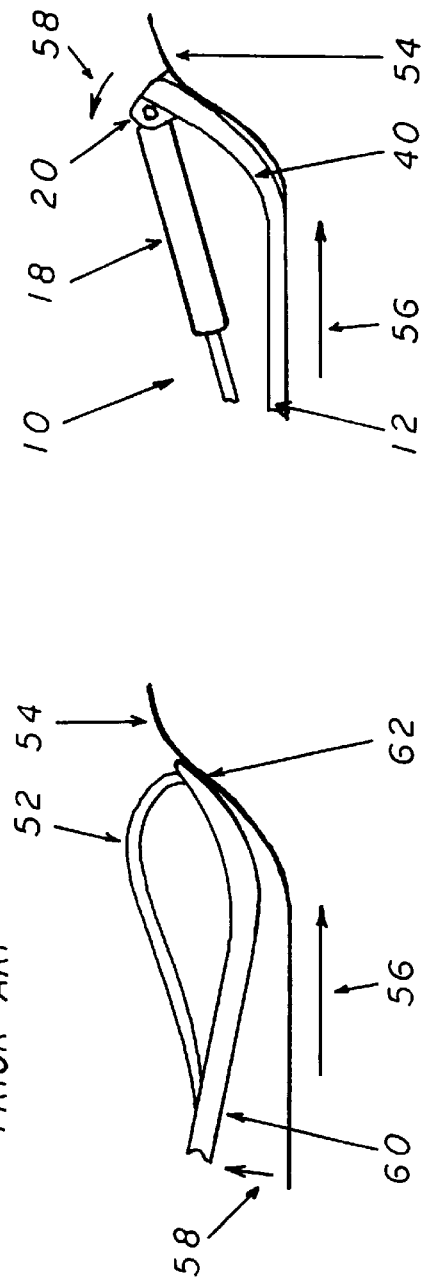
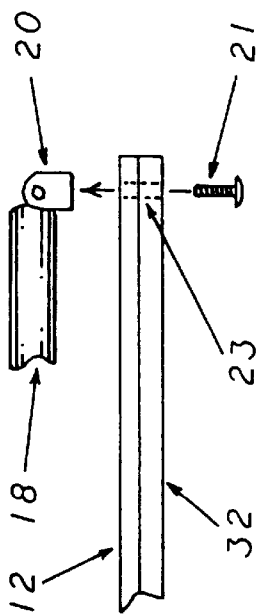

ADJUSTABLE FLEX SKI APPARATUS

BACKGROUND OF THE INVENTION

The present invention relates to an improvement in skis used on snowmobiles or other vehicles to facilitate forward movement and steering, more particularly to an adjustable flex dampened ski.

Typical snowmobiles are powered by a front mounted engine attached to a rear endless track system. The track on conventional snowmobiles is suspended using springs and gas powered shocks to absorb the bumps and aid in control and handling of the snowmobile. These snowmobiles are typically supplied with two skis attached to a rider operated steering system. The skis are placed in front of the track system and are, thus, the first part of the vehicle to meet obstacles such as rocks, logs and bumps. Different manufacturers have developed and utilized several different means of adding travel to each individual ski system. These systems range from a wishbone type suspension to an upright spring and dampener type system.

The classic, or conventional, snowmobile ski is constructed of metal and attaches to the steering system mechanism at a point near the middle of the ski. These skis are typically curved upward at the forward portion which allows the ski to ride over obstacles. The curved portion also aids the ski in traveling through snow conditions ranging from deep powder snow to slush and ice. These metal skis also have bridges or bars running along their length for stability and strength.

A stiff loop, made of metal rods, is typically attached to the front portion of the ski near the top of the front curved section. Some skis have used a piece of angle iron or bracketing to increase the strength of the loop. This rod or loop is then attached in a circular fashion back towards the center portion of the ski. The loop has several purposes, the first of which is to strengthen the ski. The loops also act as a continuation of the curved portion of the ski and, thus, enhances the skis ability to handle bumps, moguls or obstacles. These loops have also evolved into handles to aid in moving the snowmobile or picking up the front for a variety of reasons.

The metal ski has been standard for many years, but recently the industry has begun adopting skis made of metal bridges, reinforcements and plastic portions. This plastic may be of a type such as an Ultra High Molecular Weight Polyethylene (UHMW) or (UHMW-PE) plastic. This type of ski has been developed to overcome some of the disadvantages of the metal ski and to provide a lower coefficient of friction. One of these disadvantages has been that metal skis are unyielding and thus, subject to denting and bending as the ski is used in normal operation. This bending and denting eventually leads to a drop in performance of the ski and often necessitates the replacement of the ski. The use of flexible and resilient plastics has resulted in skis that are durable and able to withstand impacts that would have damaged conventional metal skis. These skis, however, are made with metal bridges, saddles or supports that result in a ski that, although resilient at it edges, is overall rigid. The problem with a ski that is overall rigid, is that when the tip of the ski encounters a bump or obstacle, the ski's lack of ability to flex will cause the surface of the ski that is in contact with the snow to rise and, thus, lose contact with the snow. The result of this is that the ski's loss of contact with the ground or snow will substantially affect the riders ability to control the vehicle, as it will tend to dart from side to side as the steering and control of the snowmobile is placed entirely upon that portion of the ski which remains in contact with the ground.

U.S. Pat. No. 5,040,818 issued to Metheny on Aug. 20, 1991, and U.S. Pat. No. 5,145,201 issued to Metheny on Sep. 8, 1992, a continuation in part issuing from the 818' patent, generally discloses one of the current plastic and metal skis. This ski has a formed plastic base with a metal bridge and saddle top. The front tip of the ski in one embodiment is equipped with a solid loop and upper bridge which holds the front of the ski in a curved and rigid form. In this embodiment the ski is substantially rigid and thus, suffers from the same handling characteristics as the metal ski in bumps. A second embodiment of this ski uses a rigid rod of adjustable length which may be used to vary the upward curvature of the ski as the rod is lengthened or shortened. This embodiment has some flex, however, the flex tends to be behind the rods connection point and in front of the metal saddle, at one point on top of the ski. This tendency to flex at one point, as the rod is solid, results in a ski that flexes too much to the point that it is damaged or broken by severe impacts such as logs or rocks, and can create a dangerous and expensive situation for the rider.

Another ski of the plastic variety is shown in U.S. Pat. No. 5,360,220 issued to Simmons on Nov. 1, 1994. This patent discloses a ski having a plastic curved base. The base has a flexible loop attached to the underside of the front and up and over the tip of the ski to a point on the upper base of the ski near the middle. The loop is attached near the middle of the ski in a slidable fashion such that the ski may flex. This configuration works to make the ski somewhat flexible, however, as the ski is pre-curved the flex is not adjustable. The loop acts to evenly distribute the bending and flexing of the ski over a large area. Although this works to alleviate the problems of flex in one point and thus prevent breakage, this design is not adjustable to a given riders size or preference. The ski operates at a preset flex within certain limits. Thus, a rider may still experience problems in bumps with darting, as the ski may be too soft for a large rider or too stiff for a small rider and, thus, flex to a point, or not flex, such that the rear portion of the ski leaves the ground and reduces a riders control of the sled.

From this discussion it can be seen that it is desirable to supply a ski that works to absorb bumps during riding. It is also desirable to make this ski adjustable to riders of a given weight and different riding styles. Further it is necessary that this ski be designed to flex evenly throughout its length so that the ski will not buckle under extreme bumps such as ditches, logs and rocks.

SUMMARY OF THE INVENTION

It is the primary objective of the present invention to provide a method of making a resilient and flexible ski that has an adjustable flex.

It is an additional objective of the present invention to provide a ski that has a pre-load built into the front curved portion of the ski which works to alleviate bumps, and keep the rear length of the ski flat on the ground thereby increasing the handling and safety of the overall vehicle.

It is still a further objective of the present invention to provide a means of dampening vibration and flex as it travels through rough terrain.

These objectives are accomplished by the use of a flexible ski which is molded in one piece entirely of UHMW plastic. The adjustable flex ski is made up of a ski body which forms the majority of the invention and provides the base to which the other components are attached. This ski body is molded in a flat configuration. The front portion of the ski is given a pre-load function by bending the forward most portion of the ski body in an upward fashion. It is then held in this position by the use of the gas pre-load shock or dampener which extends pivotally rearward from the tip of the ski to a ski saddle located on the upper center surface of the ski body. This saddle provides various attachment points for the gas pre-load shock and thus, can vary the amount of pre-load on the ski. The saddle is also supplied with an attachment point for mounting the ski on the vehicle. This configuration allows the tip of the adjustable flex ski to flex in an upward fashion when confronting obstacles which provides the operator with a greater degree of control in rough terrain.

The adjustability of the ski body can also be enhanced by the use of internally adjustable gas shocks commonly found on the market today. These types of gas shocks are internally variable in the amount of dampening force that they exert and generally use one of two configurations to effectuate the adjustments. The first of these is to use a remote adjustment apparatus that can be mounted in a location that can be reached during vehicle operation. The other common method of varying the gas shock's dampening effect is a manual adjustment ring located externally on the shock. With this configuration, the user sets the adjustment prior to beginning operation in accordance with the present conditions.

Therefore, when the present invention encounters and impacts an obstacle, the energy created by this impact is absorbed by the flexible ski body in the pre-load area of the ski and by the gas shock. Therefore, the impact absorbing motion is confined to the movement of the components of the present invention and the ski body, which remains flat on the surface over which it is traveling. This ability to flex greatly enhances directional control over the prior art as the control surfaces intended to provide directional control remain in constant contact with the ground.

For a better understanding of the present invention reference should be made to the drawings and the description in which there is illustrated and described preferred embodiments of the present invention.

DESCRIPTION OF THE DRAWINGS

FIG. 2 is a top elevation view of the present invention showing the orientation of its major components and the invention as used with an automatic adjustment device employed to vary the degree of stiffness in the dampening shock.

FIG. 3 is a side elevation view of the present invention showing the orientation of its major components and the invention as used with a manual adjustment device employed to vary the degree of stiffness in the dampening shock.

FIG. 7 is a side elevation view of the prior art showing the manner in which it interacts with severe bumps or other obstacles.

FIG. 8 is a side elevation view of the present invention showing the manner in which it interacts with severe bumps or other obstacles.

FIG. 9 is a side elevation exploded view of the present invention showing the manor in which the front shock mount bracket is mounted to the ski body.

DESCRIPTION OF THE PREFERRED EMBODIMENT

Figure 1:
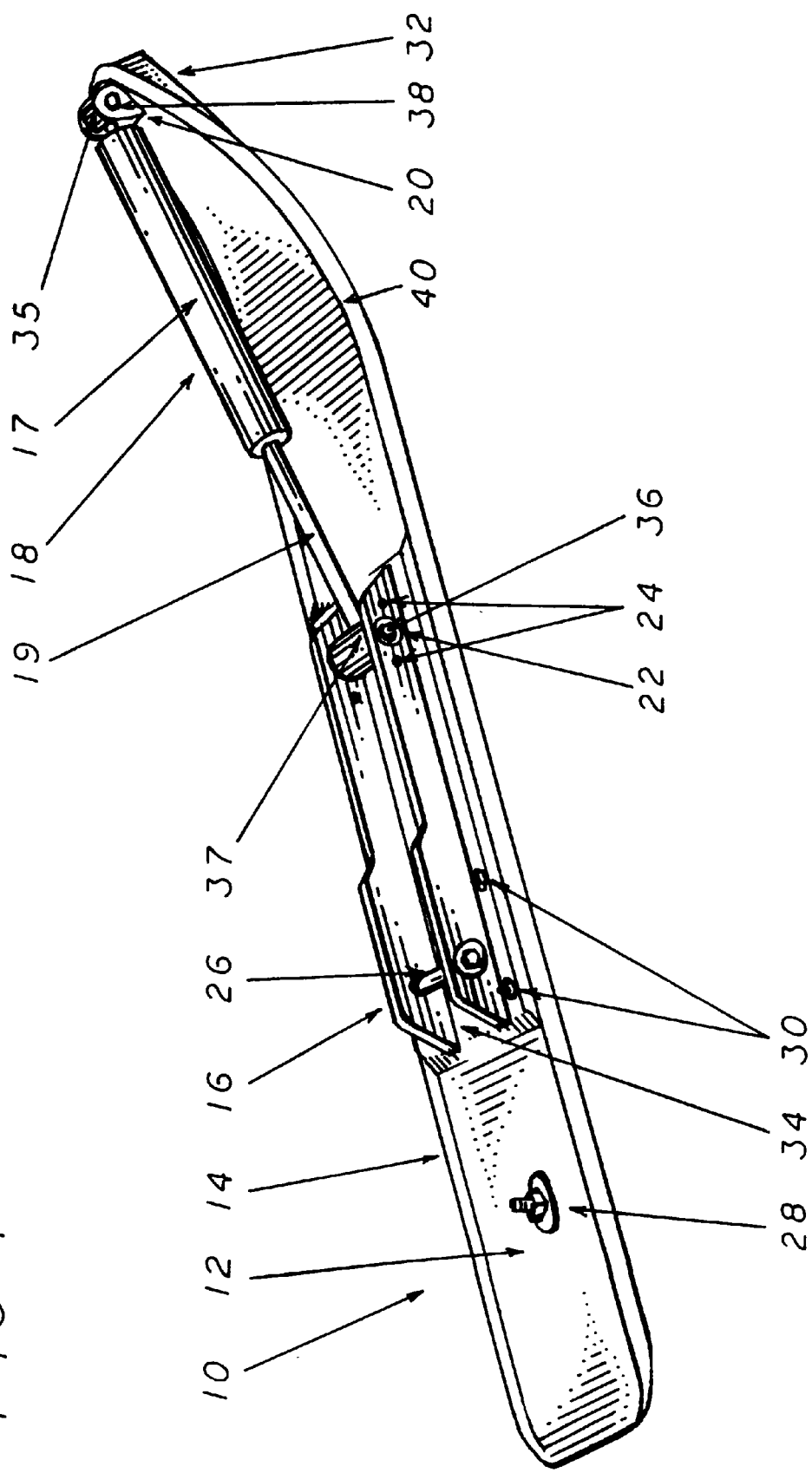
FIG. 1 is a perspective view of the present invention showing the manner in which its major components relate to one another to comprise said invention.
Figure 5:
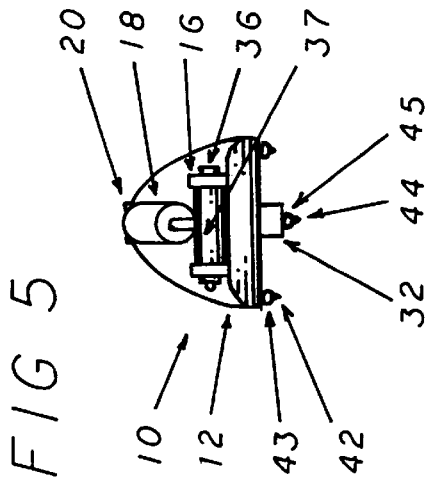
FIG. 5 is a rear elevation view of the present invention showing the orientation of the 90 degree keel in relation to the body of the invention.
Figure 4:
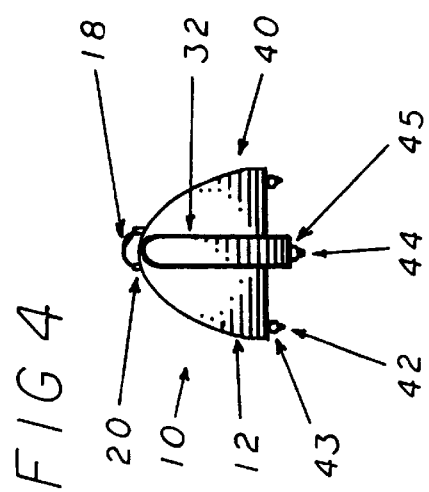
FIG. 4 is a front elevation view of the present invention showing the orientation of the 90 degree keel in relation to the body of the invention.
Figure 6:
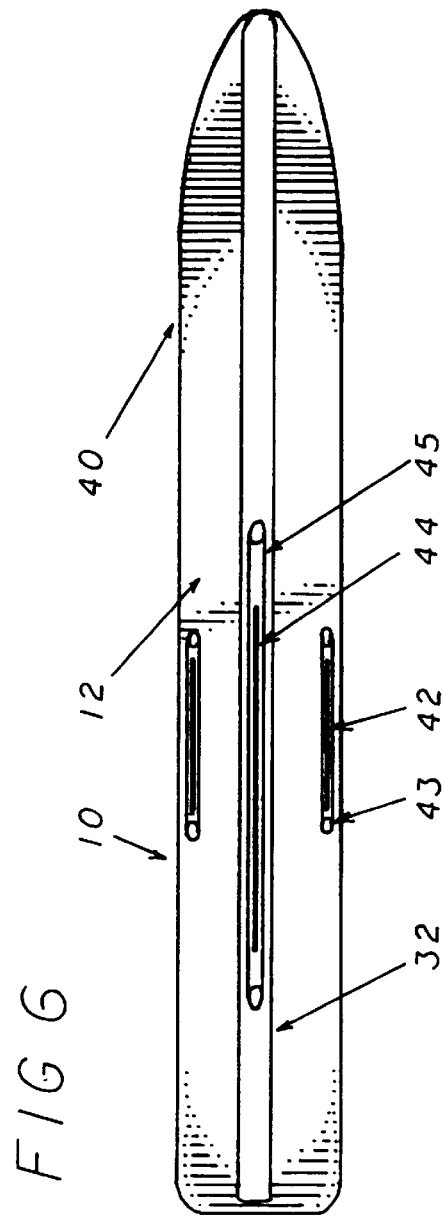
FIG. 6 is a bottom elevation view of the present invention showing the orientation of the carbide runners in relation to the 90 degree keel and the body of the invention.

Referring now to the drawings, and more specifically to FIGS. 1, 2 and 3, the adjustable flex ski 10 is made up of a ski body 12 which forms the majority of the invention and provides the base to which the other components are attached. The ski body 12 has running laterally along the entire upper lengths and extending upwards therefrom the ski edges 14 which form a shallow depression in the center of the upper surface of the ski body 12. At the longitudinal center of the ski body 12 this depression is filled in and raised above the upper most surface of the ski edges 14 to form the saddle mounting platform 34. On the upper surface of the saddle mounting platform 34 the two projections that form the ski saddle 16 which provides the attachment points for the ski mount bolt 26 and the rear shock mount 22.

The ski body 12, the saddle mounting platform 34 and the ski saddle 16 are all formed from one piece of UHMW plastic and are formed flat along the entire length in regards to the upper surface of the ski body 12. The pre-load function of the present invention is provided by bending the forward most portion of the ski body 12 at the pre-load zone 40, which narrows down to a point at its front tip, as in a standard ski, in an upward fashion. It is then held in this position by the use of the gas pre-load shock 18 (this type of shock is part of a family generally known as dampeners or shock absorbing dampeners) which extends rearward from the front shock mounting bracket 20 to the rear shock mount 22 located at the front of the ski saddle 16. The gas shock 18 is mounted in this position in its most extended configuration so that it will not allow the tip of the ski body 12 to return to its normal, or flat position. This configuration allows the tip of the adjustable flex ski 10 to flex in an upward fashion, when confronting obstacles which provides the operator with a greater degree of control in rough terrain.

The flexing motion of the present invention is controlled and dampened by the use of the gas pre-load shock 18 which comprises a gas filled barrel portion 17 pivotally attached to the ski body 12 by the use of the front shock mounting bracket 20, and a shock rod 19 which is pivotally attached to the rear shock mount 22 located on the ski saddle 16. The pivotal attachment of the gas shock 18 is accomplished at the front end by the use of the front shock pivot mounting 35 which fits inside of the front shock mount bracket 20 and then the front shock mount bolt 38 is passed from the outside of the mount bracket 20, through the pivot mount 35 and fastened on the other side of the bracket 20. The pivotal attachment of the gas shock 18 is accomplished at the rear end by the use of rear shock pivot mounting 37 which is attached to the shock rod 19, and fits between the two portions of the ski saddle 16. Again, the shock rear mount bolt 36 is passed through one of the adjustable shock mount holes 24 then through the rear shock pivot mount 37, and through the corresponding adjustable shock mount holes 24 on the other side of the ski saddle 16. This configuration allows the angle between the pivot mountings, 35 and 37, and the front shock bracket 20 and rear shock mount 22 to change as the shock 18 compresses and decompresses and, therefore, the tip of the ski body 12 to flex. Thus, as an obstacle is encountered and the tip of the ski body 12 is forced upward, the gas pre-load shock compresses and absorbs the force. This ensures that the flat portion of the ski body 12 remains in contact with the surface over which the vehicle is traveling.

The adjustable shock mounting holes 24, located on the front portion of the ski saddle 16, provide a means of varying the amount of pre-load placed on the ski body 12. This is accomplished by changing the distance between the rear shock mount 22 and the front shock mount bracket 20 and, therefore, the amount of pre-load placed on the tip of the ski body 12. For example, if the rear of the gas shock 18 is mounted to the most forward of the adjustable shock mounting holes 24, the amount of pre-load placed on the ski body 12 is relatively small, therefore, providing a softer ride that is the recommended setting for riders of lighter weights. Conversely, if the rear of the gas shock 18 is mounted to the most rearward of the adjustable shock mounting holes 24, the amount of pre-load placed on the ski body 12 is relatively large, therefore, providing a stiffer ride that is the recommended setting for riders of heavier weight.

These adjustments can also be made to compensate for varying types of conditions and for the type of riding to be done. Therefore, the present invention provides a means by which the handling characteristics of the skis can vary to improve the efficiency of the vehicle. This is especially important in racing where different tracks present a varying set of problems that can be overcome by simply adjusting the skis.

The ski saddle 16 also provides the point at which the present invention is attached to the vehicle on which it is to be used. This is accomplished by placing the ski cradle of a typical snowmobile between the two parallel members of the ski saddle 16 and passing the ski mount bolt 26 through one side of the ski saddle 16, through the ski cradle and out the other side of the ski saddle where it is secured by the use of a washer and nut. Since the method of attaching snowmobile skis is universal, this allows the present invention to be attached to and used in conjunction with any of the many makes of snowmobiles on the market today.

FIG. 9 illustrates the manner in which the front shock mount bracket 20 is attached to the ski body 12. This is accomplished by forming a bracket attachment bolt hole 23 through the ski body 12 at it most forward tip. The front shock mount bracket 20 is then placed on the front tip of the ski body 12 and secured in place by passing the bracket attachment bolt 21 through the ski body 12 to join with the front shock mount bracket 20. This figure also illustrate the flatness of the ski body 12 prior to being placed in a curved position by the gas pre-load shock 18.

Another feature of the present invention employed to enhance its steering and tracking characteristics is the use of carbide tipped runners mounted on the bottom surface of the ski body 12. The location, method of attachment and orientation of these runners is illustrated in FIGS. 2, 3, 4, 5 and 6. Typically, the present invention would be fitted with three sets of these carbide runners. The largest of these is the center carbide 44 which extends for about half of the length of the ski body and is mounted to the bottom surface of the 90 degree keel 32 (a protruding portion of the bottom surface of the ski body 12 which runs down its entire length and is used to provide the primary source of tracking and steering control). The center carbide 44 comprises a small triangular strip of extremely hard carbide steel which is permanently attached to the bottom surface of the center carbide mount 45 which is, in turn, attached to the ski body 12 by the use of a plurality of attached center carbide mounting bolts 28, which extend upward through the ski body 12, and are held in place with nuts and washers.

The side carbides 42 and side carbide mounts 43 are similarly configured, but are considerably shorter; about half that of the center carbides 44, in length. Additionally, they are attached to the ski body 12 in much the same way in that a plurality of side carbide mounting bolts 30 extend upward through the ski body 12 where they are held in place by the use of nuts and washers. Again, this is a very flexible design feature of the present invention, as it provides a means by which the carbides can be quickly removed or installed, to compensate for varying conditions encountered by the user. It also enables a person to comply with the rules of certain racing sanctioning bodies, as many of these do not allow the use of one or more of these carbides.

The adjustability of the present invention can also be enhanced by the use of internally adjustable gas shocks 18 commonly found on the market today. The use and configuration of these types of shocks 18, in conjunction with the present invention, are illustrated by FIGS. 2 and 3. These types of gas shocks 18 are internally variable in the amount of dampening force that they exert, and generally use one of two configurations to effectuate the adjustments. The first of these is to use a remote adjustment apparatus (not shown) that can be mounted in a location that can be reached during vehicle operation. A shock adjustment line 50 is then run from the remote apparatus to the gas shock 18, which transfers the user's desired setting to the shock 18. This allows a user to vary the handling characteristics of the present invention without having to stop the vehicle and, thus, provides a means by which a user can make "on the fly" adjustments to maximize performance and speed. The only disadvantage of these systems is that they can be expensive and, therefore, may not be realistic for use by the general public.

The other common method of varying the gas shock's 18 dampening effect is a manual adjustment device 48 located externally on the shock 18 itself. With this configuration, the user sets the adjustment prior to beginning operation in accordance with the present conditions. The use of these types of gas shocks 18 enhances the adjustability of the present invention and, therefore, allows the user to further fine tune the handling characteristics of his vehicle to obtain the greatest possible performance, and speed, in the encountered conditions.

An illustration of the advantages that the present invention offers over the prior art is provided in FIGS. 7 and 8. With the prior art (as shown by FIG. 7), as a conventional ski 52 encounters an obstacle 54 in its direction of travel 56, the ridged conventional ski 52 is unable to absorb the energy created by this impact. As this energy must be expended somewhere, it is transferred to an impact absorbing motion 58, which acts to lift the ski bottom 60, and causes it to lose contact with the surface upon which it is riding. This situation causes a severe loss of directional control, as the only point of the conventional ski 52 that is in contact is the bottom of the ski tip 62 which is vastly smaller in surface area than the ski bottom 60 and was not designed to be a control surface.

Conversely, when the present invention encounters an obstacle 54 in its direction of travel 56, the energy created by this impact is absorbed by the flexible ski body 12 in the pre-load zone 40 and the gas shock 18. Therefore, the impact absorbing motion 58 is confined to the movement of the components of the present invention, and the ski body 12 remains flat on the surface over which it is traveling. This greatly enhances directional control over the prior art, as the control surfaces intended to provide directional control remain in constant contact with the ground.

Although the present invention has been described in considerable detail with reference to certain preferred versions thereof, other versions are possible. For example, the materials and shape of the ski may be varied and substituted with other equivalents. Further various dampeners may be used to give a particular range of performance. It should also be stated at this point that although this invention is described in the context of a snowmobile this invention would be equally useful on airplane ski's, BOMBARDIERS, SNO-SCOOTS, and other similar vehicles. Therefore, the spirit and scope of the appended claims should not be limited to the description of the preferred versions contained herein.

What is claimed is:

1. An adjustable flex ski for use on a vehicle said ski comprising:

A flexible substantially flat elongate ski having a front tapering into a pointed tip, a middle and rear portion, and a top and bottom side;

A first connection means at the front portion of the ski at said tip;

A second connection means in the middle top portion of the ski; and

A dampener means having an upper and lower portion with said upper portion pivotally connected to said first connection means and said lower portion pivotally connected to said second connection means said dampener means being connected so as to upwardly bend said tip of said ski so as to place an upward curving pre-load on said ski between said first and second connection means, such that when said dampener means is disconnected from said ski said ski returns to a substantially flat section.

2. An adjustable flex ski as in claim 1, wherein said dampener means comprises an upper barrel and lower rod slidable in said barrel such that said dampener has a variable length between an upper extended limit and a lower contracted limit.

3. An adjustable flex ski as in claim 2, wherein said ski is a molded material such as an ultra high molecular weight plastic ski.

4. An adjustable flex ski as in claim 3, wherein said second connection means comprises at least two connection points at varying positions along the top of the ski such that the pre-load placed upon the front portion of the ski may be varied.

5. An adjustable flex ski as in claim 4, wherein said dampener is a gas charged shock absorber.

6. An adjustable flex ski as in claim 5, further comprising a gas charged shock absorber manual adjustment.

7. An adjustable flex ski as in claim 6, further comprising a gas charged shock absorber adjustment line.

8. An adjustable flex ski for use on a motorized vehicle that travels on snow and ice said ski comprising:

A flexible elongate ski having a front tapering into a pointed tip a middle and rear portion, and a top and bottom side said ski is a molded material ski made in a substantially single flat piece;

A first connection means at the front tip portion of the ski;

A second connection means in the middle top portion of the ski; and

A shock absorber dampener means having an upper barrel portion and a lower rod slidable in said barrel, such that said shock absorber has a variable length between an upper extended limit and a lower contracted limit with said upper barrel pivotally connected to said first connection means and said lower rod pivotally connected to said second connection means said shock absorber is of a length such that it holds the front portion of said ski in an upward pre-load and curved position, with said shock absorber at its upper extended limit so as to place said upward curving pre-load on said ski between said first and second connection means, such that when said dampener means is disconnected from said ski said ski returns to a substantially flat section.

9. An adjustable flex ski as in claim 8, wherein said second connection means comprises at least two connection points at varying positions along the top of the ski, such that the pre-load placed upon the front portion of the ski may be varied.

10. An adjustable flex ski as in claim 9, wherein said molded material is an ultra high molecular weight plastic.

11. An adjustable flex ski as in claim 10, further comprising a gas charged shock absorber manual adjustment.

12. An adjustable flex ski as in claim 10, further comprising a gas charged shock absorber remote adjustment line.

* * * * *